United States Patent
Wezel et al.

(10) Patent No.: US 10,766,420 B2
(45) Date of Patent: Sep. 8, 2020

(54) FOLDING JOINT FOR REAR VIEW DISPLAY DEVICE

(71) Applicant: SMR Patents S.à.r.l., Luxembourg (LU)

(72) Inventors: Christian Wezel, Stuttgart (DE); Alexandru Dobrete, Stuttgart (DE); Peter Hein, Stuttgart (DE); Andrea König, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 7 days.

(21) Appl. No.: 16/307,800

(22) PCT Filed: Jun. 12, 2017

(86) PCT No.: PCT/EP2017/064260
§ 371 (c)(1),
(2) Date: Dec. 6, 2018

(87) PCT Pub. No.: WO2017/212066
PCT Pub. Date: Dec. 14, 2017

(65) Prior Publication Data
US 2019/0176704 A1    Jun. 13, 2019

(30) Foreign Application Priority Data

Jun. 10, 2016   (DE) .................. 10 2016 110 748

(51) Int. Cl.
*E05D 11/10* (2006.01)
*B60R 1/076* (2006.01)
(Continued)

(52) U.S. Cl.
CPC ............. *B60R 1/076* (2013.01); *B60R 1/12* (2013.01); *E05D 11/105* (2013.01); *E05F 5/08* (2013.01);
(Continued)

(58) Field of Classification Search
CPC ... E05D 11/10; E05D 11/1028; E05D 11/105; E05D 11/1057; E05D 11/1064;
(Continued)

(56) References Cited

U.S. PATENT DOCUMENTS 2,035,823 A * 3/1936 Moore ................ E05D 11/1064
16/284
2,587,781 A * 3/1952 Stanfield .................... B60J 1/14
49/391
(Continued)

FOREIGN PATENT DOCUMENTS

DE        69101270 T2    10/1994
DE        29611580 U1    12/1996
EP         0816610 A2     1/1998

OTHER PUBLICATIONS

International Search Report dated Aug. 25, 2017 of International application No. PCT/EP2017/064260.
(Continued)

*Primary Examiner* — Roberta S Delisle
(74) *Attorney, Agent, or Firm* — Jones Day (57) ABSTRACT

A folding joint for attaching a rear view device includes a first hinge section, a second hinge section, the first and second hinge sections being adapted to rotate relative to each other around an axis of rotation, at least one detent or recessed surface including two depressions or recesses, a spring biased cam section which is adapted to interact with the at least one detent or recessed surface for adjustably locking the rotational movement of the first and second hinge sections relative to each other, a hinge pin at least in part coinciding with the axis of rotation, the hinge pin being adapted to rotatably connect the first and second hinge sections, and including a guide pin extending essentially (Continued)

perpendicularly from the hinge pin, and a spring biased clamping bolt arranged on the guide pin.

22 Claims, 5 Drawing Sheets

(51) Int. Cl.
*B60R 1/12* (2006.01)
*E05F 5/08* (2006.01)

(52) U.S. Cl.
CPC ....... *B60R 2001/1253* (2013.01); *E05D 11/10* (2013.01); *E05Y 2900/50* (2013.01)

(58) Field of Classification Search
CPC ............. E05D 11/1071; E05D 11/1085; E05F 1/1246; E05F 1/1253; E05F 5/08; E05Y 2900/50; B60R 1/076; B60R 1/12; B60R 2001/1253
USPC .......... 16/284, 286, 319, 325, 334, 335, 341
See application file for complete search history.

(56) References Cited

U.S. PATENT DOCUMENTS

| | | | |
|---|---|---|---|
| 7,114,292 B2* | 10/2006 | Chiang | E05D 5/0246 49/388 |
| 7,203,996 B2 | 4/2007 | Linnenbrink et al. | |
| 8,863,356 B2* | 10/2014 | Bacchetti | E05F 3/104 16/54 |
| 2005/0120632 A1* | 6/2005 | Chiang | E05D 11/1064 49/397 |
| 2007/0246945 A1* | 10/2007 | Chiang | E05D 11/1064 292/92 |
| 2010/0018004 A1* | 1/2010 | Ochiai | E05D 11/1057 16/250 |

OTHER PUBLICATIONS

Written Opinion dated Aug. 25, 2017 of International application No. PCT/EP2017/064260.

* cited by examiner

FOLDING JOINT FOR REAR VIEW DISPLAY DEVICE

CROSS-REFERENCE TO RELATED ART

This application is a National Stage Entry of International Patent Application No. PCT/EP2017/064260, filed Jun. 12, 2017, which claims the benefit of foreign priority to German Patent Application No. DE 10 2016 110 748.4, filed Jun. 10, 2016, each of which is incorporated by reference in its entirety herein for all purposes.

BACKGROUND OF THE INVENTION

1. Field of the Invention

The following description relates to a folding joint for attaching a rear view display device to a vehicle including a first hinge section and a second hinge section where the first and second hinge sections are adapted to be rotational relative to each other around an axis of rotation. A rear view display device for a vehicle including such a folding joint and a vehicle including such a rear view display device are also described.

2. Related Art

In modern day vehicles, camera based systems are becoming increasingly popular. These vehicles typically include vision systems that have rear view display devices with cameras and/or conventional mirrors. For example, in camera based systems, the images of cameras on the left-hand side, right-hand side, the front and the back of the vehicle are shown to the driver, instead of, or in addition to conventional mirrors. The respective rear view display devices are usually attached to the vehicle using folding joints. Usually, rear view display devices, regardless of whether they include cameras or only conventional mirrors, are usually held in the deployed or locked position by the folding joint, while at the same time the folding joint enables forward folding and rearward folding of the rear view device to avoid damages to the folding joint and/or to the rear view display device upon impact of an external mechanical force. For example, during maneuvering the vehicle in constraint spaces, the rear view display device might touch another car or a wall exerting an external force onto the folding joint. Due to the external force, the folding joint might then be folded in the forward or rearward direction.

For example, a conventional folding joint is described by EP Patent No. 1 498 314 B1. Here, first and second hinge sections are interconnected where the first hinge section is mounted in a rotatable manner to the second hinge section. However, the overall height of the joint is fairly large making the shape of the folding joint rather bulky.

SUMMARY OF THE INVENTION

A folding joint for attaching a rear view display device to a vehicle includes a first hinge section and a second hinge section, the first and second hinge sections are adapted to be rotational relative to each other around an axis of rotation characterized by a spring biased cam section, which is adapted to interact with at least one detent or recessed surface for adjustably locking the rotational movement of the first and second hinge sections relative to each other, and the detent or recessed surface includes at least two depressions or recesses corresponding to locking positions for adjustably locking the rotational movement of the first and second hinge sections relative to each other.

Here, the term "first and second hinge section" can be used to refer to a base frame and to a case frame of a rear view display device, respectively.

The folding joint may include an elastic element, preferably a spring, in particular a coil spring or a wave spring, for spring biasing the spring biased cam section.

The second hinge section may include at least one slot for accommodating at least part of the first hinge section, or the first hinge section may include at least one slot for accommodating at least part of the second hinge section.

Each depression or recess for receiving a spring biased cam element of the spring biased cam section to thereby adjustably lock the rotational movement of the first and second hinge sections relative to each other may include an indent having edges inclined at an angle of approximately 45° for allowing the cam element to glide over the inclined edges of the depression to release the lock. The detent or recessed surface may include three depressions or recesses spaced at angular positions of approximately −60°, 0°, and 60° around the axis of rotation, where 0° marks a position where the first and second hinge sections are essentially not rotated relative to each other.

The first and second hinge sections may include plastic material, preferably a polyamide material.

The first hinge section may be adapted to hold the rear view display device with the rear view display device preferably including at least one reflective element and/or at least one camera module, and the second hinge section is adapted to attach to the vehicle.

A hinge pin at least in part coinciding with the axis of rotation may be adapted to rotatably connect the first and second hinge sections.

A spring biased clamping bolt may provide the spring biased cam section, preferably at one end thereof where one end of the spring biased clamping bolt is telescopically arranged.

The detent or recessed surface may be provided by the first hinge section or the second hinge section.

The hinge pin may include a guide pin, extending essentially perpendicularly from the hinge pin, and the spring biased clamping bolt may be arranged on the guide pin.

The term "hinge pin" can be used to refer to an essentially cylindrically object that can be used to interlink the first and second hinge sections. Also, the term "guide pin" can be used to refer to an essentially cylindrically object, where the guide pin can be attached to the circumference of the hinge pin.

The guide pin can be formed as an integral part with the hinge pin or can be attachable, preferably screwable, to the hinge pin where, preferably, the hinge pin and/or the guide pin include metal material.

It is proposed that the first hinge section includes a first opening, preferably a through-hole, aligned essentially with the axis of rotation where the first opening is adapted to accommodate at least part of the hinge pin; and a second opening extending essentially perpendicularly from the first opening in the direction of the second hinge section to accommodate at least part of the hinge pin.

The one end of the spring biased clamping bolt can be telescopically arranged on the guide pin so that at least part of the guide pin can be moved relative to the hinge pin.

The elastic element can be at least partly arranged around the guide pin.

The spring biased cam section can have at least one cam element, preferably a cam element having a protrusion and edges inclined at an angle of approximately 45°, and/or the cam section can be disposed on an end of the spring biased clamping bolt that is located opposite the end of the spring biased clamping bolt which is arranged on the guide pin.

The second hinge section can include a receiving opening, preferably a through hole, aligned essentially with the axis of rotation, for receiving at least part of the hinge pin to rotatably connect the second hinge section to the first hinge section, preferably the second hinge section including a recess around the receiving opening for at least partially enclosing a cap arranged on one end of the hinge pin.

The second hinge section can include at least one detent surface extending essentially radially in the slot of the second hinge section where the detent surface extends at least in part around the axis of rotation.

The spring biased clamping bolt may include the cam section with at least one cam at one end, and the spring of the elastic element is arranged around a part of the spring biased clamping bolt adapted to move said one end.

The spring biased clamping bolt can at least partly be moved within a channel provided by the first or second hinge section against the force of the elastic element, with the detent or recessed surface being provided by the second or first section, respectively.

A first, second, and third plate may be mounted on the hinge pin, preferably concentrically around the hinge pin, where the first plate provides the detent or recessed surface, and the second plate provides the spring biased cam section.

The spring of the elastic element may be arranged between the second plate and a third plate, with the third plate being arranged concentrically around the hinge pin and/or being fixed relative to the hinge pin and/or being provided as a cap.

In another aspect, a rear view display device for a vehicle, preferably for a motor vehicle, may include at least one folding joint.

In yet another aspect, a vehicle may include at least one rear view display device.

It has been advantageously found that the folding joint can be realized with a very flat design, which neither obstructs the driver's view nor obstructs the viewing angle of the rear view display device that is attached to it. Also, using such a folding joint does not unnecessarily adversely affect the vehicles drag coefficient.

For example, it has been found that a spring biased cam section having just one cam element is sufficient to rotationally lock two sections of the folding joint relative to each other.

A wave spring has been found to be advantageous for the spring biasing due to its compact and strong character. Further, the force that is required to release the lock can be easily adjusted by using elastic elements for spring biasing that have different spring constants. A wave spring, as described, is preferred but the folding joint is not limited to include such a wave spring.

By utilizing a guide pin including a spring biased clamping bolt attached to the hinge pin, separate functionalities can be combined into one component that are realized in the prior art folding joint with separate components that cannot be combined into one component.

A simple structure may be provided by a spring biased clamping bolt which can move within a channel provided by one of the hinge sections to lock or unlock the other hinge section relative to the one hinge section against the force of a spring.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

Figure 1:
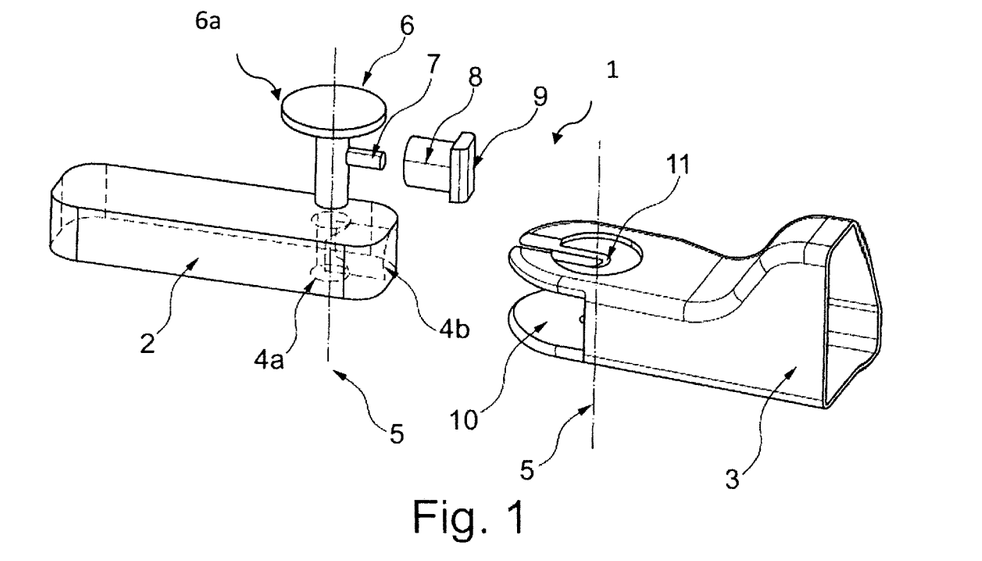
FIG. 1 shows an exploded view of an example of a folding joint with a first and a second hinge section.

FIG. 1 shows a folding joint 1 according to a first example for attaching a rear view display device to a vehicle with a first hinge section 2 and a second hinge section 3. The first hinge section 2 can be adapted to hold a rear view display device for a vehicle, which might be, for example, a rear view mirror, a camera, or a combination of both. The second hinge section 3 can be adapted to attach to the vehicle. For example, the second hinge section 3 can be adapted to attach to front doors of the vehicle at a location where traditionally rear view mirrors are attached to.

The first hinge section 2 may be essentially elongated and may include a first opening 4a for allowing a hinge pin 6 to be inserted. As illustrated in FIG. 1, the first opening 4a may be aligned with the axis of rotation 5. In the shown example, the opening 4a is shown as a through-hole. The skilled person, however, would know that the opening 4a could just partly extend through the material of the first hinge section 2. Also, as shown in FIG. 1, the first hinge section 2 may include a second opening 4b that extends perpendicularly from the first opening 4a in the direction of the second hinge section 3.

According to FIG. 1, the hinge pin 6 includes an essentially cylindrical body and a flat cap 6a on one of its ends so that the hinge pin 6 can be kept in the first opening 4a. When installed, a guide pin 7 that extends perpendicularly from the hinge pin 6 may be located in the second opening 4b. The skilled person would know that there are various possibilities for inserting the guide pin 7. For example, the first hinge section 2 could include a corresponding slot opening, or the guide pin 7 could be attached to the hinge pin 6, once the hinge pin 6 is mounted in the opening 4a.

FIG. 1 also illustrates a spring biased clamping bolt 9 that can be mounted on the guide pin 7. The skilled person would know that this could be done, for example, telescopically so that the clamping bolt 9 can move relative to the guide pin 7. When mounted, the clamping bolt 9 may be kept pushed away from the guide pin 7 using an elastic element 8, and can be moved towards the hinge pin 6 against the force of the elastic element 8. The skilled person would know that the elastic element 8 could be a helical coil made of spring steel that could be arranged around the guide pin 7 or could be any other elastic object capable of storing mechanical energy. The clamping bolt 9 may include a folding geometry that is adapted to interact with at least one detent surface of the second hinge section 3. In the example that is shown in FIG. 1, the clamping bolt 9 may include a cam section having one cam element with edges having an angle of approximately 45° that can be pressed by means of the elastic element 8 in a correspondingly shaped depression in the detent surface of the second hinge section 3 and can keep the first hinge section 2 and the second hinge section 3 rotationally locked relative to each other. However, the skilled person would know that in another example, the detent surface may be arranged in the second hinge section and may include a cam section. The first hinge section may include a correspondingly shaped geometry for rotationally locking the two sections relative to each other.

FIG. 1 also shows that the second hinge section 3 includes a slot 10 for accommodating at least part of the first hinge section 2 so that the axis of rotation 5 extends through the first 2 and the second 3 hinge sections when assembled. The second hinge section 3 may also include a recess 11 in which the cap 6a of the hinge pin 6 can be kept when both the first 2 and the second 3 hinge sections are mounted to keep them fixated relative to each other. Also, the second hinge section 3 may include a through-hole 3a where the hinge pin 6 can extend through. Referring to FIG. 1, another slot for the hinge pin 6 may extend into the recess 11 which can be used for attaching and removing the first and second hinge sections 2, 3.

Figure 2:
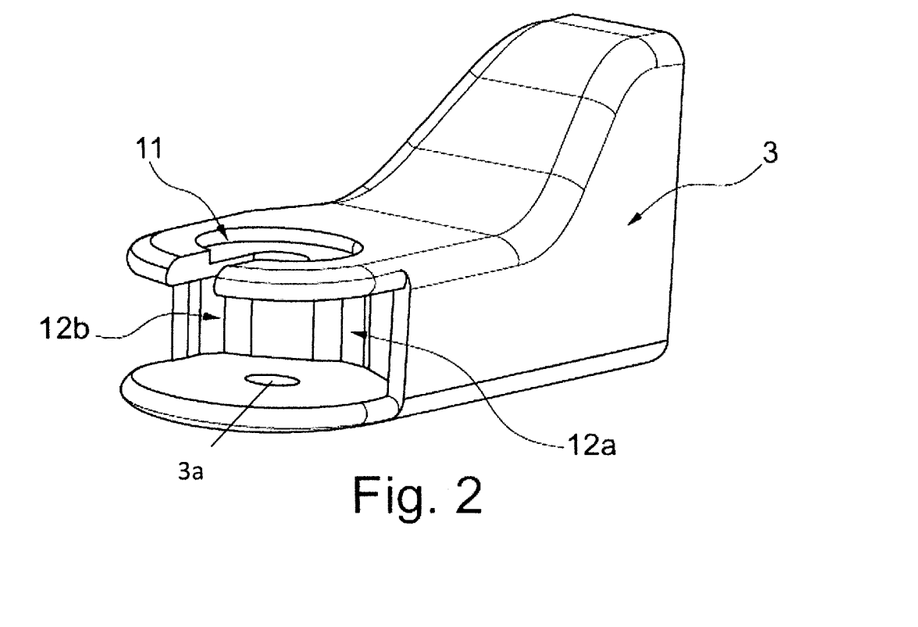
FIG. 2 shows a perspective view of an example of the second hinge section of the folding joint of FIG. 1.

FIG. 2 illustrates a schematic view of the second hinge section 3. The second hinge section 3 corresponds to the hinge section 3 that is shown in FIG. 1. In FIG. 2, the detent surface in the second hinge section 3 may be located essentially radially around the axis of rotation. As illustrated in FIG. 2, the detent surface may include a first depression 12a including a geometry where the cam element of the clamping bolt (not shown in figure) can be pushed in. FIG. 2 also illustrates that the first depression 12a includes edges with an angle of approximately 45°. During operation of the folding joint 1, the cam element of the clamping bolt 9 may be held in the first depression 12a using the elastic element. If either of the two hinge sections 2, 3 is rotated relative to the other section using an external force that is sufficiently high, the clamping bolt 9 can be moved towards the hinge pin 6 against the force of the elastic element 8 while the cam section of the clamping bolt 9 glides over the inclined edges of the first depression 12a to release the connection. Afterwards, the first and the second hinge sections 2, 3 can be moved essentially freely relative to one another while the clamping bolt 9 glides along a section of the curved detent surface. In the shown example, the detent surface includes a second depression 12b that is radially spaced from the first depression 12a.

Figure 3:
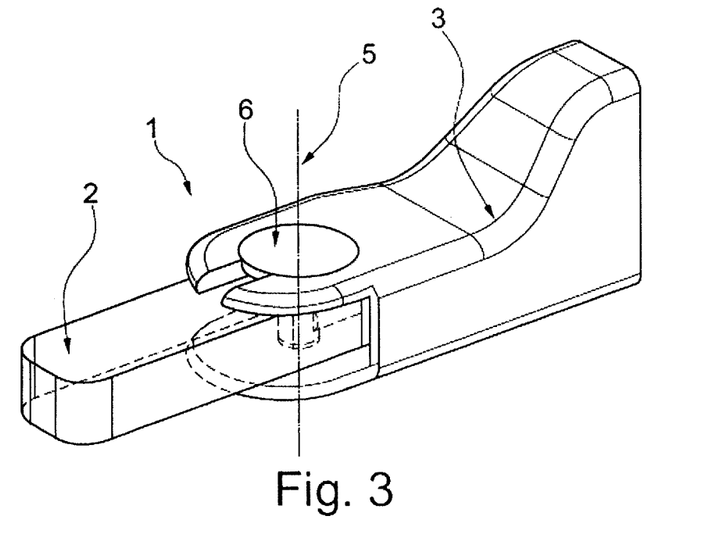
FIG. 3 shows a perspective view of an example of the assembled folding joint of FIG. 1.

FIG. 3 shows a schematic view of the assembled folding joint 1. Referring to FIG. 3, the hinge pin 6 may extend along the axis of rotation 5. During operation, the rear view display device on the end of the first hinge section 2 could be rotated relative to the vehicle around an axis of rotation 5. Also, by using the folding joint 1, the position of the rear view display device could be locked in positions where the cam section of the clamping bolt is held in a corresponding depression. As described above, the lock can be released when the second hinge section 2 is moved with a force that is sufficiently high enough, i.e. the force depends on the force of the elastic element biasing the clamping bolt, relative to the vehicle.

Figure 4:
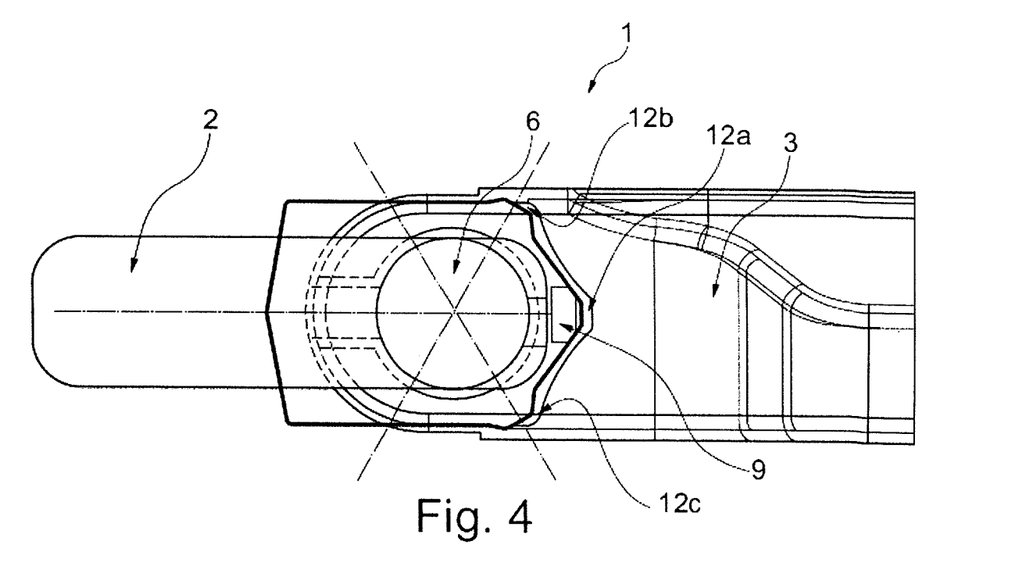
FIG. 4 shows a transparent top view of an example of the assembled folding joint of FIG. 3.

FIG. 4 shows a transparent top view of an assembled folding joint 1 according to an example of the invention. The folding joint 1 that is shown in FIG. 4 could be the folding joint 1 that is shown in FIG. 3. Referring to FIG. 4, the detent surface may include a first depression 12a, a second depression 12b, and a third depression 12c. Accordingly, the first hinge section 2 can be locked in three rotational positions relative to the second hinge section 3. The three locking positions may be located at rotation angles of −60°, 0°, and 60°. However, other locking positions may be used for example at least −60°, at least 0°, at least 60°, at most −60°, at most 0°, and at most 60°. In the shown example, the clamping bolt 9 may be located in the first depression 12a. However, the skilled person would know that depending on the application of the folding joint 1, the locking positions could be also arranged in different locations, and/or more or less locking positions could be realized.

Figure 5:
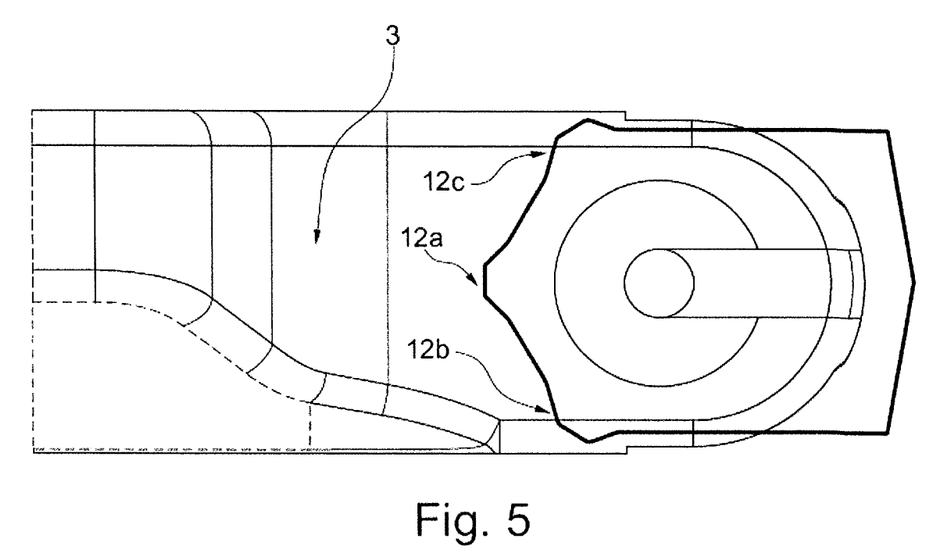
FIG. 5 shows a top view of an example of the second hinge section of FIG. 2.

The top view of the second hinge section 3 of FIG. 5 shows the first depression 12a, the second depression 12b, and the third depression 12c highlighted by means of a black line.

Figure 6:
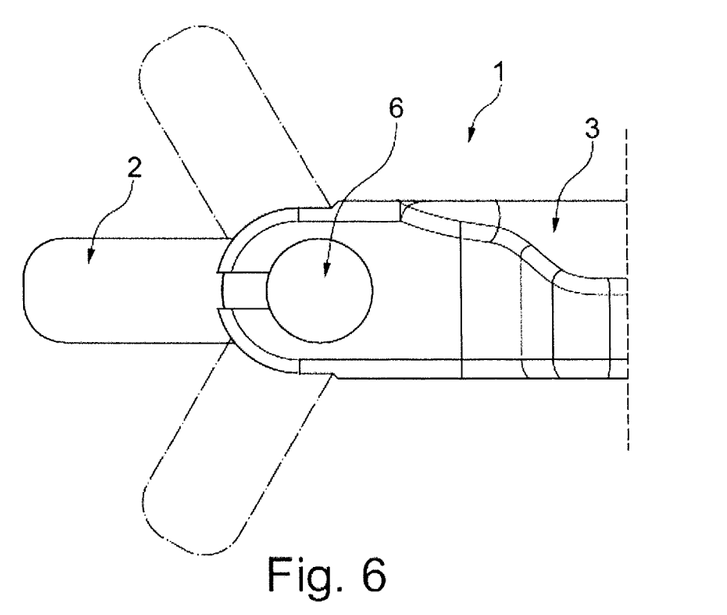
FIG. 6 shows a top view of an example of the assembled folding joint of FIG. 4 indicating different locking positions.

FIG. 6 shows a top view of an assembled folding joint 1 according to an example of the invention indicating different locking positions. The folding joint 1 that is shown in FIG. 6 could be the folding joint that is shown in one of the previous figures. Referring to FIG. 6, broken lines illustrate that the first hinge section 2 could be locked in three rotational positions relative to the second hinge section 3. The three locking positions may be located in the shown example at rotation angles of −60°, 0°, and 60°, or other positions as described above.

Figure 7:
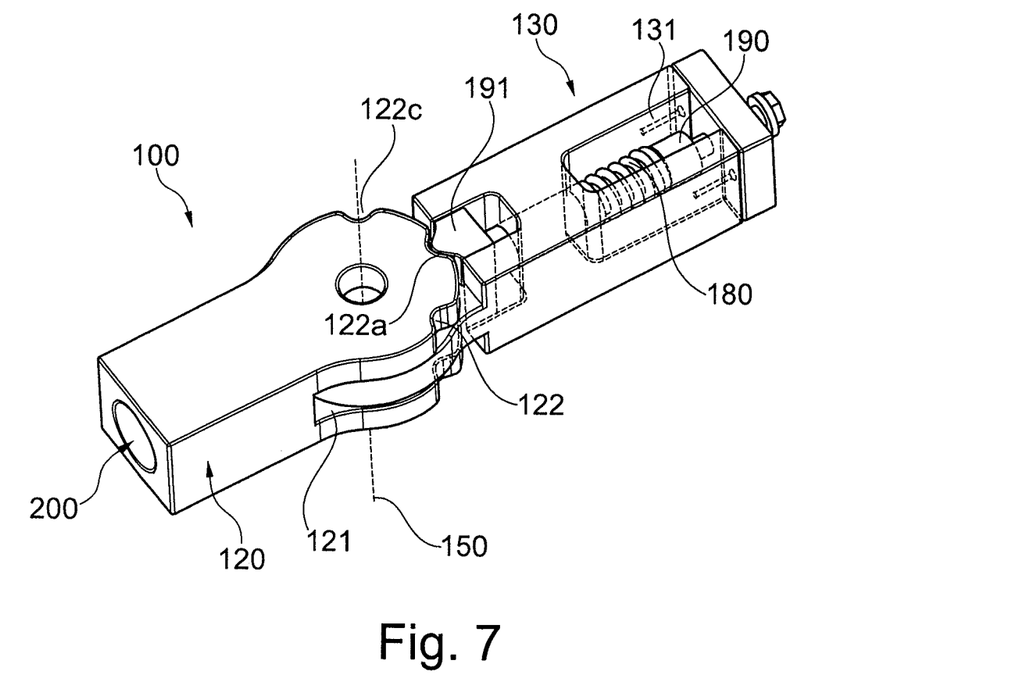
FIG. 7 shows a perspective view of an example of a folding joint with a first and a second hinge section.
Figure 8:
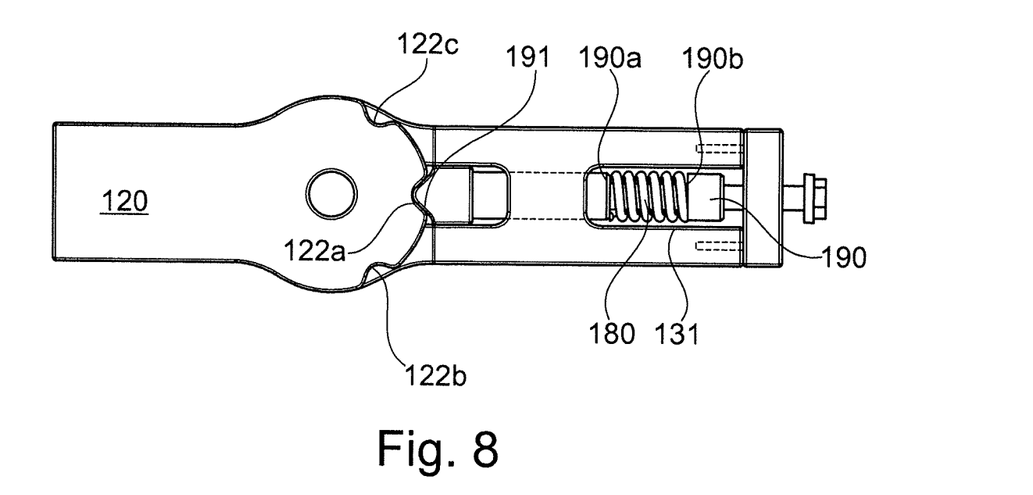
FIG. 8 shows a top view of an example of the folding joint of FIG. 7.

FIGS. 7 and 8 show a folding joint 100 according to another example of the invention for attaching a rear view display device to a vehicle with a first hinge section 120 and a second hinge section 130. The first hinge section 120 can be adapted to hold a rear view display device for a vehicle, for example, a camera module 200. The second hinge section 130 can be adapted to attach to the vehicle.

The first hinge section 120 is essentially elongated and may include a slot 121 for partially inserting the second hinge portion 130 such that both hinge sections 120, 130 can be rotated around an axis of rotation 150. In addition, the first hinge section 120 may be provided with a first, second and third recess 122a, 122b, 122c defining three locking positions of the first hinge section 120 relative to the second hinge section 130, namely located at rotation angles of −60°, 0°, and 60°, with the 0° locking position being shown in FIGS. 7 and 8. However, other locking positions may be used for example at least −60°, at least 0°, at least 60°, at most −60°, at most 0°, and at most 60°.

Also shown in FIGS. 7 and 8 is a spring biased clamping bolt 190 with a cam 191 for engaging one of the recesses 122a, 122b, 122c of the first hinge section 120. The cam 191 is provided by a slide of the clamping bolt 190 which can move within a channel 131 of the second hinge section 130 against the force of a coil spring 180. The spring 180 may be arranged around a portion of the clamping bolt 190 between two shoulder 190a, 190a thereof. The skilled person would know that this could be done telescopically, for example, so that the cam 191 can move relative to the first hinge section 120.

During operation of the folding joint 100, the cam 191 of the clamping bolt 190 may be held in the first recess 122a using the coil spring 180. If either of the two hinge sections 120, 130 are rotated relative to the other section using an external force that is sufficiently high, the clamping bolt 190 can be moved against the force of the coil spring 180, while the cam 191 glides over the inclined edges of the first recess 122a to release the connection. Afterwards, the first and the second hinge sections 120, 130 can be moved essentially freely relative to one another, while the cam 191 glides along a section of the curved surface of the first hinge section 120 until it enters into either the second or the third recess 122b, 122c depending on the direction of rotation.

The folding joint 100 allows reduction of the overall height of a folding mechanism to lower than 30 mm leading to a space saving which is an advantage when providing the first hinge section 120 as a camera pod, as illustrated in FIG. 7.

Figure 9:
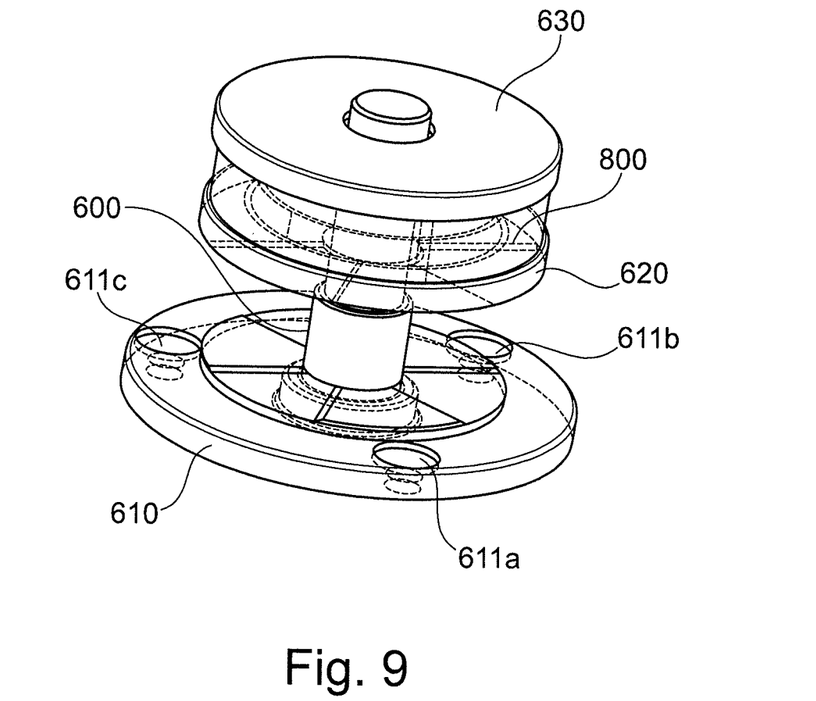
FIG. 9 shows an exploded view of an example of a hinge pin of a folding joint carrying a wave spring.
Figure 10:
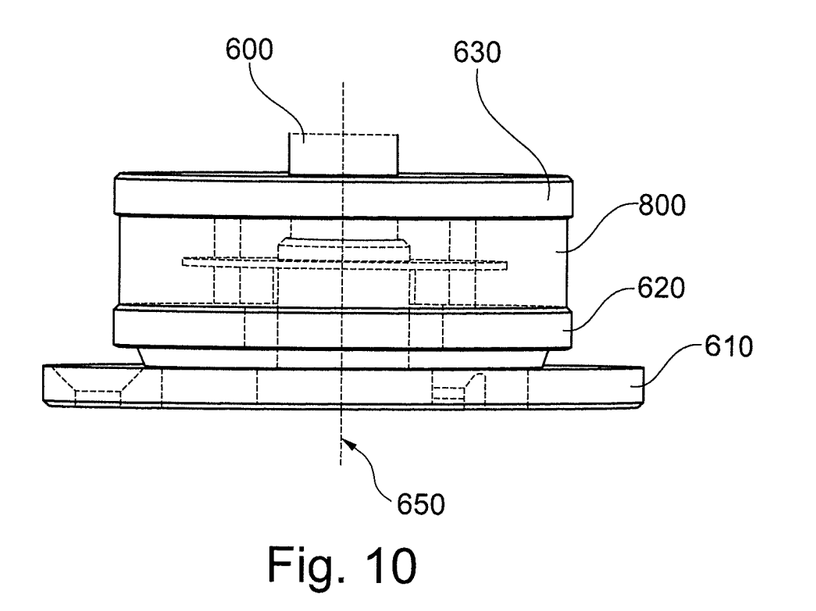
FIG. 10 shows a side view of an example of the assembled hinge pin with the wave spring of FIG. 9.

FIGS. 9 and 10 show a hinge pin 600 of a folding joint according to a third example of the invention for attaching a first hinge section to a second hinge section with three locking positions relative to each other. The skilled person will understand that the number of locking positions can be adapted to special needs.

In this example, the hinge pin 600 is carrying a first, a second, and a third plate 610, 620, 630 and a wave spring 800. The first plate 610 and the third plate 630 can be fixed relative to the hinge pin 600 whereas the second plate 620 may be biased against the first plate 610 by the wave spring 800 which is placed between the second and the third plate 620, 630 in the example shown in FIGS. 9 and 10. Referring to FIG. 9, the first plate 610 may be provided with three recesses 611a, 611b, 611c located at rotation angles of −60°, 0°, and 60° around an axis of rotation 650 shown in FIG. 10, whereas the second plate 620 may be provided with three corresponding cams (not shown) to engage with said recess 611a, 611b, 611c, as illustrated in FIG. 10.

In order to break the connection between the first and the second plate 610, 620 a moment of force has to be applied which slides the cams out of the recesses 611a, 611b, 611c against the force of the wave spring 800 such that the hinge sections can be rotated until the cams enter the next recesses 611a, 611b, 611c.

For example, a wave spring has several advantages over a coil spring in that the required axial space can be reduced by up to 50% and a load in an axial direction can be transferred 100%. While the wave spring, as described, is an example, the folding joint is not limited to include including a wave spring.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

REFERENCE SIGNS 1 folding joint
2 first hinge section
3 second hinge section
3a through hole
4a first opening
4b second opening
5 axis of rotation
6 hinge pin
6a cap
7 guide pin
8 elastic element
9 clamping bolt
10 slot
11 recess
12a-c depression
100 folding joint
120 first hinge section
121 slot
122a-c recess 130 second hinge section
131 channel
150 axis of rotation
180 coil spring
190 clamping bolt
190a+b shoulder
191 cam
200 camera module
600 hinge pin
610 first plate
611a-c recess
620 second plate
630 third plate
650 axis of rotation

What is claimed is:

1. A folding joint for attaching a rear view display device to a vehicle, comprising:
   a first hinge section;
   a second hinge section, the first and second hinge sections being adapted to rotate relative to each other around an axis of rotation;
   at least one detent or recessed surface comprising at least two depressions or recesses corresponding to locking positions for adjustably locking a rotational movement of the first and second hinge sections relative to each other;
   a spring biased cam section which is adapted to interact with the at least one detent or recessed surface for adjustably locking the rotational movement of the first and second hinge sections relative to each other;
   a hinge pin at least in part coinciding with the axis of rotation, the hinge pin being adapted to rotatably connect the first and second hinge sections, and comprising a guide pin extending essentially perpendicularly from the hinge pin; and
   a spring biased clamping bolt arranged on the guide pin.

2. The folding joint of claim 1, further comprising an elastic element including a coil spring or a wave spring for spring biasing the spring biased cam section.

3. The folding joint of claim 2, wherein the elastic element is at least partly arranged around the guide pin.

4. The folding joint of claim 2, wherein the spring biased clamping bolt comprises the cam section with at least one cam at one end, and
   the elastic element comprises the spring, the spring being arranged around a part of the spring biased clamping bolt adapted to move the one end.

5. The folding joint of claim 4, wherein the spring biased clamping bolt can at least partly be moved within a channel provided by the first or second hinge section against a force of the elastic element, with the at least one detent or recessed surface being provided by the second or first hinge section, respectively.

6. The folding joint of claim 2, further comprising a first, a second, and a third plate mounted on the hinge pin concentrically around the hinge pin,
   wherein the first plate provides the at least one detent or recessed surface, and the second plate provides the spring biased cam section.

7. The folding joint of claim 6, wherein the elastic element comprises the spring, and the spring of the elastic element is arranged between the second plate and a third plate, with the third plate being at least one of arranged concentrically around the hinge pin, fixed relative to the hinge pin, and provided as a cap.

8. The folding joint of claim 1, wherein the second hinge section comprises at least one slot for accommodating at least part of the first hinge section, or
   the first hinge section comprises at least one slot for accommodating at least part of the second hinge section.

9. The folding joint of claim 1, wherein each of the at least two depressions or recesses receive a spring biased cam element of the spring biased cam section to thereby adjustably lock the rotational movement of the first and second hinge sections relative to each other, and comprise an indent having inclined edges inclined at an angle of approximately 45° for allowing the cam element to glide over the inclined edges and unlock.

10. The folding joint of claim 1, wherein the at least two depressions or recesses of the detent or recessed surface are three depressions or recesses spaced at angular positions around the axis of rotation of approximately −60°, 0°, and 60°, wherein 0° marks a position where the first and second hinge sections are essentially not rotated relative to each other.

11. The folding joint of claim 1, wherein the first and second hinge sections comprise plastic material comprising a polyamide material.

12. The folding joint of claim 1, wherein the first hinge section is adapted to hold the rear view display device, with the rear view display device comprising at least one of a reflective element and a camera module, and the second hinge section is adapted to attach to the vehicle.

13. The folding joint of claim 1, wherein the spring biased clamping bolt provides the spring biased cam section at one end thereof, and another end of the spring biased clamping bolt is telescopically arranged.

14. The folding joint of claim 1, wherein at least one detent or recessed surface is provided by the first hinge section or the second hinge section.

15. The folding joint of claim 1, wherein the guide pin is formed as an integral part with the hinge pin or the guide pin is screwable to the hinge pin, and
    at least one of the hinge pin and the guide pin comprises metal material.

16. The folding joint of claim 1, wherein the first hinge section, comprises:
    a first opening comprising a through-hole aligned essentially with the axis of rotation, the first opening being adapted to accommodate at least part of the hinge pin; and
    a second opening extending essentially perpendicularly from the first opening in the direction of the second hinge section to accommodate at least part of the hinge pin.

17. The folding joint of claim 1, wherein the one end of the spring biased clamping bolt is telescopically arranged on the guide pin so that at least part of the guide pin can be moved relative to the hinge pin.

18. The folding joint of claim 1, wherein at least one of the spring biased cam section has at least one cam element having a protrusion and edges inclined at an angle of approximately 45°, and
    the spring biased cam section is disposed on an end of the spring biased clamping bolt that is located opposite another end of the spring biased clamping bolt which is arranged on the guide pin.

19. The folding joint of claim 1, wherein the second hinge section comprises a receiving opening comprising a through hole aligned essentially with the axis of rotation for receiving at least part of the hinge pin to rotatably connect the second hinge section to the first hinge section, and the second hinge section comprises a recess around the receiving opening for at least partially enclosing a cap arranged on an end of the hinge pin.

20. The folding joint of claim 19, wherein the second hinge section comprises at least one detent surface extending essentially radially in the slot of the second hinge section, and the detent surface extends at least in part around the axis of rotation.

21. A rear view display device for a vehicle, comprising at least one folding joint according to claim 1.

22. A vehicle, comprising at least one rear view display device according to claim 21.

* * * * *